United States Patent
Oliveira et al.

(10) Patent No.: US 6,579,208 B2
(45) Date of Patent: Jun. 17, 2003

(54) METHOD AND APPARATUS FOR PROVIDING SYNCHRONIZATION OF LOW TO HIGH SHIFTS IN A TRANSFER CASE

(75) Inventors: Gary A. Oliveira, Lake Orion, MI (US); Richard Thomas Fosmoe, Bonlanden (DE); John R. Ficht, Wales, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 25 days.

(21) Appl. No.: 09/824,608

(22) Filed: Apr. 2, 2001

(65) Prior Publication Data

US 2001/0029221 A1 Oct. 11, 2001

Related U.S. Application Data

(63) Continuation-in-part of application No. 09/484,472, filed on Jan. 18, 2000, now Pat. No. 6,251,045.

(51) Int. Cl.⁷ .......................... B60K 41/04; B60K 59/30
(52) U.S. Cl. ........................ 477/124; 477/110
(58) Field of Search ............................ 477/124, 109, 477/110; 475/303, 153, 293; 74/339

(56) References Cited

U.S. PATENT DOCUMENTS

| | | | |
|---|---|---|---|
| 4,664,217 A | 5/1987 | Welch et al. ............... 180/247 |
| 4,718,303 A | 1/1988 | Fogelberg .................. 74/710.5 |
| 4,828,070 A | 5/1989 | Maramatsu ................. 180/247 |
| 5,150,637 A | 9/1992 | Ninomiya et al. ............ 74/335 |
| 5,346,442 A | 9/1994 | Eastman .................... 475/223 |
| 5,407,024 A | 4/1995 | Watson et al. .............. 180/248 |
| 5,655,618 A | * 8/1997 | Wilson et al. .............. 180/197 |
| 5,680,308 A | 10/1997 | Warren ................ 364/424.098 |
| 5,682,790 A | * 11/1997 | Genise ................... 477/124 X |
| 5,699,870 A | 12/1997 | Warren ....................... 180/247 |
| 5,704,867 A | 1/1998 | Bowen ........................ 475/221 |
| 5,771,477 A | 6/1998 | Showalter et al. ............ 701/51 |
| 5,867,092 A | 2/1999 | Vogt .......................... 340/456 |
| 5,974,906 A | * 11/1999 | Stine et al. .............. 477/124 X |
| 5,993,354 A | * 11/1999 | Winks .................... 477/109 X |
| 5,997,435 A | * 12/1999 | Back ...................... 477/110 X |
| 6,038,503 A | * 3/2000 | Wolf et al. ............. 477/110 X |
| 6,042,504 A | * 3/2000 | Gualtieri et al. ........ 477/124 X |
| 6,269,293 B1 | * 7/2001 | Correa et al. ........... 477/109 X |

* cited by examiner

*Primary Examiner*—Sherry Estremsky
*Assistant Examiner*—Roger Pang
(74) *Attorney, Agent, or Firm*—Bliss McGlynn, P.C.; Greg Dziegielewski (57) ABSTRACT

The present invention is directed toward a method to digitally control a transfer case through a digital data bus to provide synchronized low to high shift capabilities in vehicles that employ a controller area network (CAN) system. In addition, a transfer case that can be digitally controlled in a vehicle with a controller area network (CAN) system to provide synchronized low to high shifts is also disclosed.

20 Claims, 5 Drawing Sheets

METHOD AND APPARATUS FOR PROVIDING SYNCHRONIZATION OF LOW TO HIGH SHIFTS IN A TRANSFER CASE

This application is a continuation-in-part of application Ser. No. 09/454,472, filed Jan. 18, 2000, now U.S. Pat. No. 6,251,045.

BACKGROUND OF THE INVENTION

1. Field of the Invention

The present invention relates, generally, to two-speed (high-low) transfer cases and, more particularly, to a method and apparatus for providing synchronized shifts between low and high gearing arrangements in a digitally controlled two-speed transfer case in a motor vehicle employing a Controller Area Network (CAN) digital data bus system.

2. Description of the Related Art

Transfer cases are used in full and part-time, four-wheel drive vehicles to distribute driving power received through an input shaft from the vehicle's transmission to a pair of output drive shafts. One of the drive shafts powers the vehicle's front wheels and the other of the drive shafts powers the vehicle's rear wheels. In vehicles that permit shifting between two-wheel drive and four-wheel drive modes, the input shaft of the transfer case provides continuous drive power to one of its output shafts and selectively provides drive power to the other output shaft via some type of disengageable or otherwise adjustable coupling, such as a viscous coupling, electromagnetic clutch, or positionable spur gearing. Other drive modes are sometimes provided, including four-wheel drive high (4H) for higher four-wheel drive speeds, four-wheel drive low (4L) for lower four-wheel drive speeds, neutral for disengaging the transmission from the front and rear axles to allow towing, and locked four-wheel drive for controlling wheel slippage. Historically, transfer cases were configured such that the vehicle had to be stopped before shifting between low and high gears. Typically, this requirement resulted from the lack of any type of synchronizer within the transfer case to facilitate this shift. In these cases, an adjustable coupling was used to manually shift between drive modes using a mechanical shift actuator.

On the other hand, synchronization of the input and output shafts of the transfer case prior to shifting between low and high gears and into and out of four-wheel drive facilitates shifts while the vehicle is moving. This mode of operation has been referred to as shift "on the fly." Numerous synchronization devices have been proposed in the related art. For example, it is known to employ a clutch which is operable to translate torque either directly between the input and output shafts (high speed) or between the input and output shafts via a planetary gear reduction set. Clutches of this type may be spring-biased such that shifting is not fully accomplished until the relative speeds of the rotating members to be coupled have achieved a certain level of synchronization. However, some synchronization devices known on the related art have suffered from the disadvantage that they are overly complex and add excessive cost to the transfer case. Others have failed to achieve adequate synchronization prior to the shifting event resulting in slip and/or unacceptable noise.

Mechanical shift actuators gave way to electronically controlled shift actuators, particularly for shift actuators that can be operated by a rotational source, such as an electric motor. U.S. Pat. No. 4,664,217 issued to Welsh et al. on May 12, 1987 discloses such an electric shift actuator. More specifically, the Welsh et al. '217 patent teaches the use of a reversible DC electric motor to rotate a cammed shift actuator to selectively shift drive gearing within the transfer case between a neutral position, two-wheel drive mode and low and high speed four-wheel drive modes. Selection of a desired drive mode is accomplished by operating the motor under the control of a microprocessor-based control circuit. The microprocessor commands a motor drive circuit to energize the motor to run in either the clockwise or counterclockwise direction to achieve the desired drive mode. While this type of electronic shift control was an improvement in the related art, the problem of effectively and efficiently synchronizing the rotation of members to be coupled during any given shifting operation remained.

U.S. Pat. No. 5,771,477 issued to Showalter et al. on Jun. 23, 1998, proposed one solution for this problem. More specifically, the Showalter '477 patent discloses a method and apparatus for synchronizing low to high transfer case shifts using sensors to sense the speed of the input and output shafts of the transfer case. A microprocessor is employed to measure the change in speed over time of each of the input and output shafts and to make a prediction when the relative speeds of the shafts will be equal. The microprocessor then commands operation of a shift actuator at a predetermined time before the shafts are synchronized such that shifting is accomplished when the speeds of the input and output shafts are substantially equal. While the '477 method and apparatus was an improvement over the related art, there still remains a need for greater control and more accurate synchronization prior to shifting between low and high speeds in a transfer case.

Correspondingly, as transfer case art developed, the complexity of the vehicles in which transfer cases are used has also evolved, revealing further shortcomings in the present state of transfer case design. One manner in which vehicle complexity has increased is the notable design trend toward integrated vehicle systems and controls. This had lead to a progression of innovations in interconnected computer controlled vehicle systems, with each succeeding model year moving closer to complete computer and electronic control of the vehicle. The shortcomings in the present state of transfer case design have become apparent as the progression toward complete vehicle system and sub-systems integration has found its way to four-wheel drive vehicle platforms. Specifically, in addition to the need to provide improved synchronized shifting for economy and efficiency, transfer cases also need to be incorporated into the overall vehicle system control interface as well.

In moving toward total electronic control of vehicle systems, manufactures have had to cope with the expanding complexity in all automotive systems and sub-systems in general. As the vehicle systems themselves have become more complex and interconnected the number of individually dedicated point-to-point wire connections between systems, controllers, and sensors has dramatically increased. This has translated to larger, heavier and more cumbersome wiring harnesses, which must carry varying voltages and currents, are difficult to manufacture and install, and are susceptible to mechanical and environmental stresses. Additionally, the larger, more sophisticated harnesses add to the production and maintenance costs of the vehicle. In response to this problem, vehicle manufactures have begun to replace the discrete, dedicated wiring with common digital interfaces or data bus networks. This type of digital system interface is known as a small area network (SAN).

In application, these SANs are simple digital wiring systems, also known as a digital data bus, similar to computer network systems. The SAN is routed through the vehicle and replaces a large percentage of the costly and bulky discrete, point-to-point wiring. One specific type of SAN being used in automobiles is the Controller Area Network (CAN) system. The CAN system is a proven, pre-existing, international SAN standard that has been adopted by some vehicle manufactures. It is a readily available, off-the-shelf system that utilizes a minimum of additional components within the vehicle. The CAN system electronically interconnects all the network members by a simple two wire, twisted pair cable and provides high-speed serial digital data transfer between all members in the system. The network members consist of the various vehicle systems and sub-systems, or in many cases, their electronic control units.

In operation, one of the CAN system members may be an on-board computer or microprocessor serving as a vehicle management system responsible for the overall control of the vehicle. The vehicle's management system communicates with the various system controllers (i.e., engine, fuel control, braking, suspension, climate control, etc.) through the CAN system while deriving discrete inputs and feedback from the vehicle operator and various sensors about the vehicle. The CAN system may also be designed without a centralized microprocessor, allowing direct interface between all the system controllers through the digital data bus cable. As such, the CAN system offers accurate high-speed digital interface between all the vehicle's systems and sub-systems. Additionally, since the vehicles systems are interconnected, constant system-wide monitoring for detailed maintenance and troubleshooting data collection is available.

In this manner, the CAN system greatly increases the efficiency and cost-effectiveness of design, production, and operation of a vehicle. However, this highlights a current disadvantage of contemporary transfer case design, which is the fact that they have not been adapted to work with a digital data bus system such as the CAN system. Current transfer case designs lack the ability to function with the CAN system so that a contemporary transfer case would be isolated from the rest of the vehicle's computer controlled and monitored systems. Since current transfer cases suffer from this lack of electronic control and digital interface with the other vehicle systems, they are not able to provide the truly coordinated and synchronized LO to HI shifting that is desired.

Therefore, considering the shortcomings of the prior art transfer cases in that they are designed for conventionally wired vehicles, cannot interface to a digital data system such as the CAN system, and have limited synchronization methods, there is a need for a transfer case that can be digitally controlled and a method to provide fully synchronized shifting of a digitally controlled transfer case in a vehicle that employs a CAN digital data network system.

SUMMARY OF THE INVENTION

The present invention overcomes the disadvantages in conventional transfer cases by providing a method to digitally control a transfer case through a digital data bus to provide synchronized low to high shift capabilities in vehicles that employ a controller area network (CAN) system. More specifically, a method is provided comprising the first step of initiating an actuator to move a clutch from engagement with a gear set to a predetermined neutral synchronization point. The method also includes the step of sensing the speed of the actuator and routing the signal to the control unit. The time for the clutch to reach the predetermined neutral synchronization point as a function of the sensed speed of the actuator and the known remaining rotational distance through which the actuator must move for the clutch to reach the predetermined neutral synchronization point is then determined used this method. The method also includes the step of maintaining the actuation of the clutch until it has reached the predetermined neutral synchronization point. The actuator is then commanded to stop when the calculated time has elapsed for the clutch to reach the predetermined neutral synchronization point. The rotational speed of the transfer case input and output shafts is then sensed and compared to determining a difference value. The method further includes the steps of commanding changes in engine RPM and automatic transmission gear settings through the control area network to bring the difference value within a predetermined range and completing the shift from low to high by commanding further actuation of the clutch from the predetermined neutral synchronization point to a direct torque engagement of the input and output shafts when the calculated difference in the rotational speeds of the input and output shafts is determined to fall within a set predetermined range, indicating synchronization of the shafts.

The present invention also overcomes the disadvantages in conventional transfer cases by providing a transfer case that can be digitally controlled which provides synchronized low to high shifts and is adapted to be integrated into a vehicle with a controller area network (CAN) system. More specifically, the transfer case includes an input shaft, an output shaft, and a reduction gear set selectively operable to translate torque between the input and output shafts at reduced speeds. A clutch is operable to translate torque between the input and output shafts either directly or through the reduction gear set. An actuator, having a rotational output, is operatively coupled to the clutch for moving the clutch between predetermined positions. A control unit is employed in connection with the transfer case to affect the method of synchronizing low to high shifts in the transfer case. To this end, the control unit operatively moves the clutch from engagement with the gear reduction set to a neutral position. The control unit senses the speed of the actuator as it moves the clutch to the neutral position. The control unit further determines the time until the clutch will reach a predetermined neutral synchronization point using the sensed speed of the actuator and the remaining known rotational distance through which the actuator must move for the clutch to reach the predetermined neutral synchronization point. The control unit is further operable to stop the actuator when the clutch has reached the neutral synchronization point. The control unit then senses and compares the rotational speeds of the input and output shafts and signals the actuator to complete the shift from the neutral synchronization point to high by moving the clutch to provide direct torque translation between the input and output shafts when the difference in the rotational speeds of the input and output shafts is less than a predetermined value. The control unit further has a digital data interface to allow the transfer of digital data between the control unit and other vehicle systems through the CAN system.

Accordingly, the present invention is a method and an apparatus for providing synchronization of low to high shifts in a transfer case that is digitally controlled within a vehicle utilizing the CAN system, allowing for a high level of control and an accurate synchronization during the shift between low and high speeds. Furthermore, these objectives are achieved with the method and apparatus of the present invention in an efficient, cost effective and relatively simple manner.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
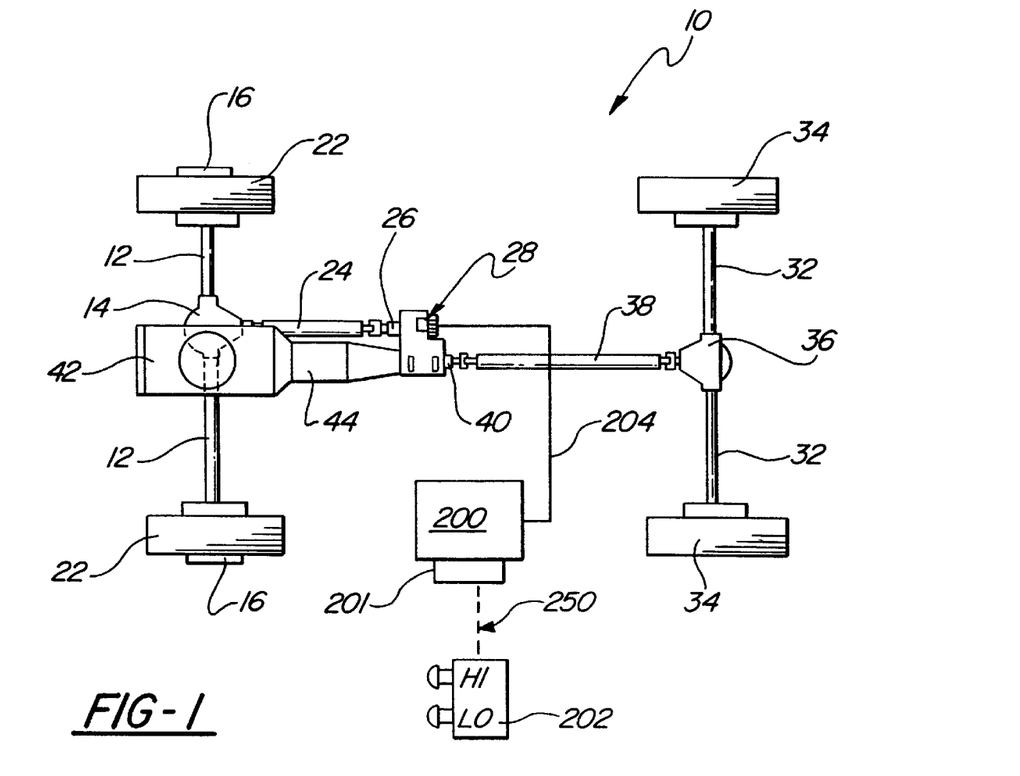
FIG. 1 is a schematic view of a vehicle driveline and associated components of a synchronous shift system according to the present invention.

A vehicle having a four-wheel drive system and a two-speed transfer case incorporating the present invention is schematically illustrated in FIG. 1 and generally indicated at 10. The vehicle 10 includes a pair of front (secondary) axles 12 which are centrally coupled to a front (secondary) differential 14. The outer ends of the front (secondary) axles 12 may be connected to a respective pair of locking hubs 16. The locking hubs 16 are preferably vacuum operated and are in fluid communication with a controlled vacuum source (not shown) through associated vacuum lines (also not shown). When a vacuum is present in the vacuum lines, the hubs 16 lock and couple the front (secondary) axles 12 to a respective pair of front (secondary) tire and wheel assemblies 22. It will be appreciated that either electrically or mechanically operated locking hubs 16 may be utilized with the present invention. As a first alternative, live front (secondary) axles 12 may be utilized with a front (secondary) axle disconnect (not illustrated) disposed in the front (secondary) differential 14. Additionally, the front (secondary) axles 12 may be permanently coupled to both the front tire and wheel assemblies 22 and the front differential 14 and driven by its input. The front differential 14 is driven by a front (secondary) drive or prop shaft 24, which in turn, is driven by the front (secondary) output shaft 26 of a transfer case, generally indicated at 28.

The vehicle 10 further includes a pair of aligned, rear (primary) axles 32. The outer ends of the axles 32 are coupled to rear (primary) tire and wheel assemblies 34 and their opposite ends are coupled to and driven by a rear (primary) differential 36. The rear differential 36, in turn, is driven by a rear (primary) drive or prop shaft 38 which is, in turn, driven by a rear (primary) output shaft 40 of the transfer case 28. It will be appreciated that the various aforementioned shafts are coupled by a plurality of universal joints as needed in accordance with conventional vehicle drive train practice. A prime mover, such as an internal combustion engine 42 drives a conventional transmission 44 which may be either a manual transmission with a clutch or an automatic transmission.

The designations "primary" and "secondary" appearing above refer to drive lines in a vehicle 10 which are primarily and secondarily intended to propel the vehicle 10. In the following description, the inventors have described a system in which the rear drive shaft 38 transmits all drive torque to the rear wheels 34 in two-wheel drive mode and delivers a portion of the torque in the four-wheel drive mode. Accordingly, in the vehicle 10, the rear drive shaft 38 may, more generically, be referred to or designated the primary drive or prop shaft 38 and this shaft 38 and the associated components, the axles 32, the rear tire and wheel assemblies 34 and the rear differential 36, constitute the primary drive line. Conversely, the front drive shaft 24 is disengaged in two-wheel drive mode but will transfer drive torque in the four-wheel drive mode. Thus, the front drive shaft 24 may, more generically, be referred to or designated the secondary drive or prop shaft 24 and this shaft 24 and the associated components, the front axles 12, the front differential 14, the locking hubs 16, the front tire and wheel assemblies 22 constitute the secondary drive line.

It should be understood that the drive line components of the vehicle 10 described herein are fully suitable for use with vehicle drive systems conventionally designated front-wheel drive where the front drive shaft 24 and associated components will be the primary drive line and the rear drive shaft 38 and associated components will thus be the secondary drive line.

Figure 2:
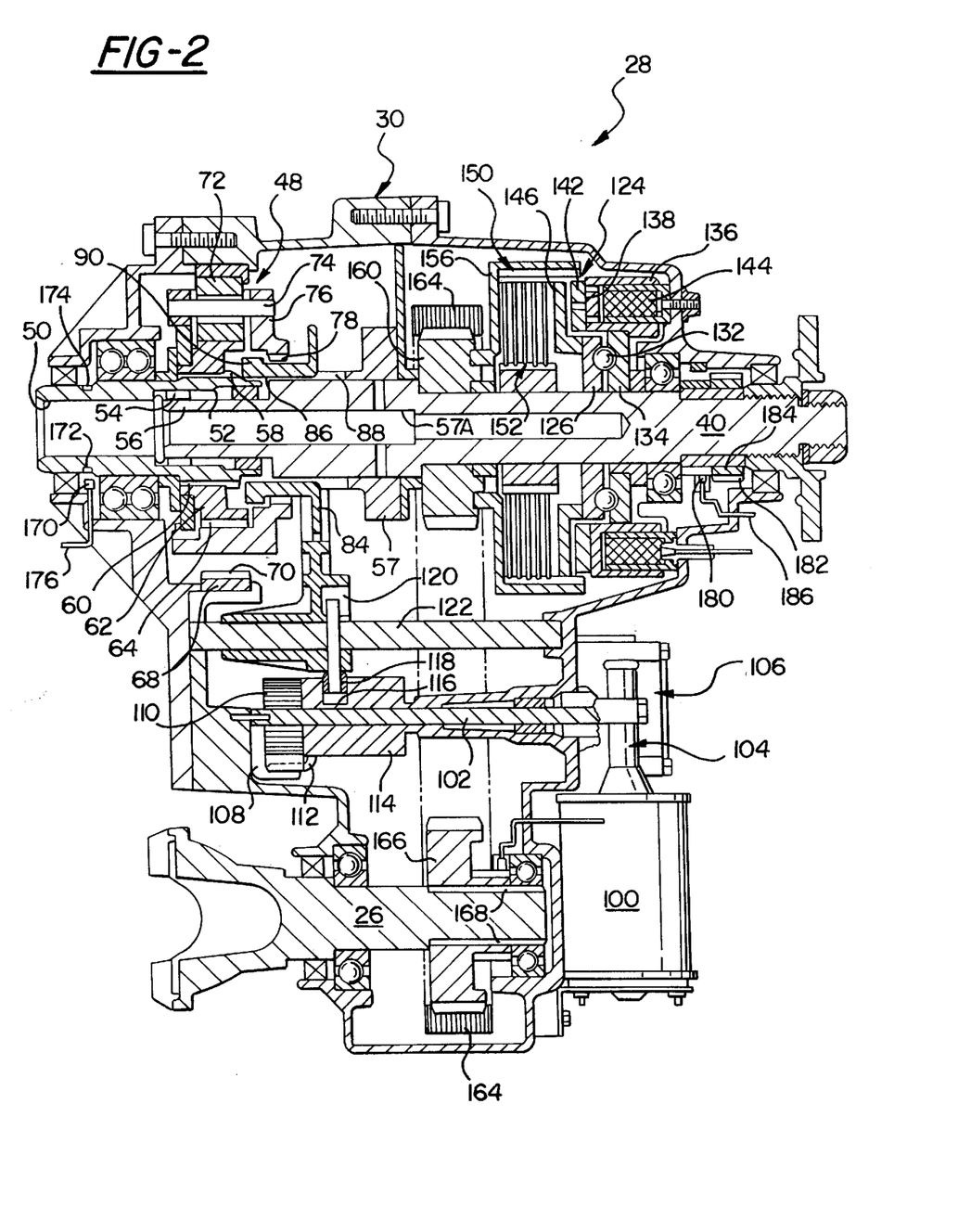
FIG. 2 is a full, cross-sectional side view of a two-speed transfer case according to the present invention.

With reference now to FIG. 2, the transfer case 28 of the present invention will be described in greater detail. The transfer case 28 includes a housing, generally indicated at 30, which is preferably cast of metal in two mating sections and includes apertures, blind openings, supports, bearing receiving surfaces and other features specifically adapted to receive the components of the transfer case 28. More specifically, the transfer case 28 includes a planetary gear set, generally indicated at 48, which is driven by an input shaft 50 rotatably disposed within the transfer case 28. The input shaft 50 is coupled to and driven by the output of the transmission 44. The input shaft 50 defines a re-entrant bore 52, which receives a roller bearing assembly 54. The roller bearing assembly 54, in turn, receives and rotatably supports the forward terminus 56 of the rear (primary) output shaft 40 of the transfer case 28. A gerotor pump 57 is secured about and rotates with the output shaft 40, providing lubricating fluid under pressure to a passageway 57A which extends axially within the output shaft 40 and distributes lubricating fluid to the components of the transfer case 28.

The exterior surface of the input shaft 50 defines a plurality of external teeth 58, which engage complementarily formed teeth 60 on the inner circular surface of a sun gear 62 of the planetary gear set 48. The sun gear 62 is thus coupled to the input shaft 50 for rotation therewith. The sun gear 62 includes a plurality of gear teeth 64 disposed about its periphery. A ring gear 68 is aligned with the sun gear teeth 64. The ring gear 68 has inwardly directed gear teeth 70. A plurality of pinion gears 72 are rotatably received upon a like plurality of stub shafts 74, which are mounted within a carrier 76. The carrier 76 includes a plurality of inwardly directed teeth 78 disposed on a surface generally adjacent the external teeth 58 defined by the input shaft 50. The planetary gear set 48 is more fully described in U.S. Pat. No. 4,440,042 which is assigned to the assignee of the present invention and which is incorporated herein by reference.

A clutch 84 is received about the output shaft 40 and is supported thereon for axial, sliding movement relative to the output shaft 40. In the embodiment illustrated in FIG. 2, the clutch 84 is of the dog type. The clutch 84 defines an inwardly directed plurality of teeth 86 which are complementary to and mate with a like plurality of external teeth 88 disposed on the output shaft 40. The dog clutch 84 thus rotates with the output shaft 40 but may slide axially therealong. The teeth 86 are also complementary to the external teeth 58 on the input shaft 50. The dog clutch 84 further includes a plurality of external teeth 90 which are complementary to the teeth 78 disposed on the carrier 76 and which may be selectively mated therewith as will be described in greater detail below.

The dog clutch 84 is axially translatable to a first, forward position wherein the external teeth 58 couple with the teeth 86 and thus provide direct torque translation and therefore drive between the input shaft 50 and the output shaft 40. In order to facilitate the smooth engagement between the external teeth 58 on the input shaft 50 and the teeth 86 of the dog clutch 84, the transfer case 28 may include a mechanical synchronizer (not shown) which acts to reduce the rotational speed of the input shaft 50 so that it approaches the rotational speed of the output shaft 40 during low to high shifts, as is commonly known in the art. On the other hand, when the dog clutch 84 is translated fully to the rear, it couples the carrier 76 to the output shaft 40 through the mating of the teeth 78 and external teeth 90 on the dog clutch 84. In this position, the speed of the output shaft 40 relative to the input shaft 50 is reduced in accordance with the selected gear ratio of the planetary gear set 48. In addition, the dog clutch 84 may also be moved to third, neutral position, midway between the forward, direct drive position and the rear, reduced speed drive position. The neutral position is illustrated in FIG. 2. In the middle, neutral position, the input shaft 50 is disconnected from the output shaft 40 and no torque is translated therebetween.

The position of the dog clutch 84 is commanded by an actuator 100. In the preferred embodiment, the actuator is an electric shift control motor 100. The electric shift control motor 100 rotates a drive shaft 102 through a worm gear drive, generally indicated at 104. The drive shaft 102 is suitably supported for rotation with the housing 30 of the transfer case 28. The position of the drive shaft 102 is monitored and read by an encoder assembly, generally indicated at 106, which provides information about the current position of the drive shaft 102 and the dog clutch 84.

The drive shaft 102 terminates in an arm 108 that is coupled to a spring assembly 110. The spring assembly 110 is wrapped about the drive shaft 102 and is also engaged by an arm 112, which extends axially from a cylindrical cam 114. The spring assembly 110 functions as a resilient coupling between the drive shaft 102 and the cylindrical cam 114 to absorb lag between the movement commanded by the drive motor 100 and the drive components so that the shift motor 100 is allowed to reach its final requested position. The spring assembly 110 allows smooth and fast response to a requested repositioning of the dog clutch 84 in situations where the inwardly directed teeth 86 of the dog clutch 84 do not instantaneously engage the teeth 78 of the carrier 76. When synchronization of the input shaft 50 and the dog clutch 84 has been substantially achieved, any potential energy stored in the spring assembly 110 rotates the cylindrical cam 114 to its requested position, thus completing the shift.

The cylindrical cam 114 defines a helical track 116 that extends approximately 270 degrees about the cam 114. The helical track 116 receives a pin and cam follower 118 that is coupled to a fork assembly 120. The fork assembly 120 is supported for bi-directional translation upon a fixed shaft 122 and engages the periphery of the dog clutch 84. Bi-direction movement of the fork assembly is induced through the cam follower 118 as it moves along the helical track 116. More specifically, rotation of the shaft 102 axially repositions the cam follower assembly 118 and thus axially positions the dog clutch 84 through the fork assembly 120 to one of the three positions described above.

Figure 3:
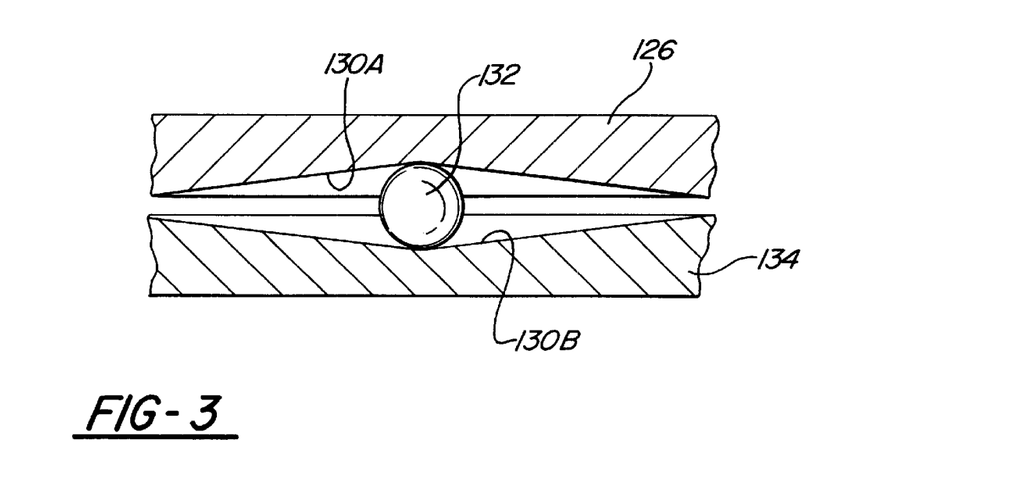
FIG. 3 is a flat pattern development of the load transferring balls and ramp in the modulating clutch of the transfer case of the present invention.
Figure 4:
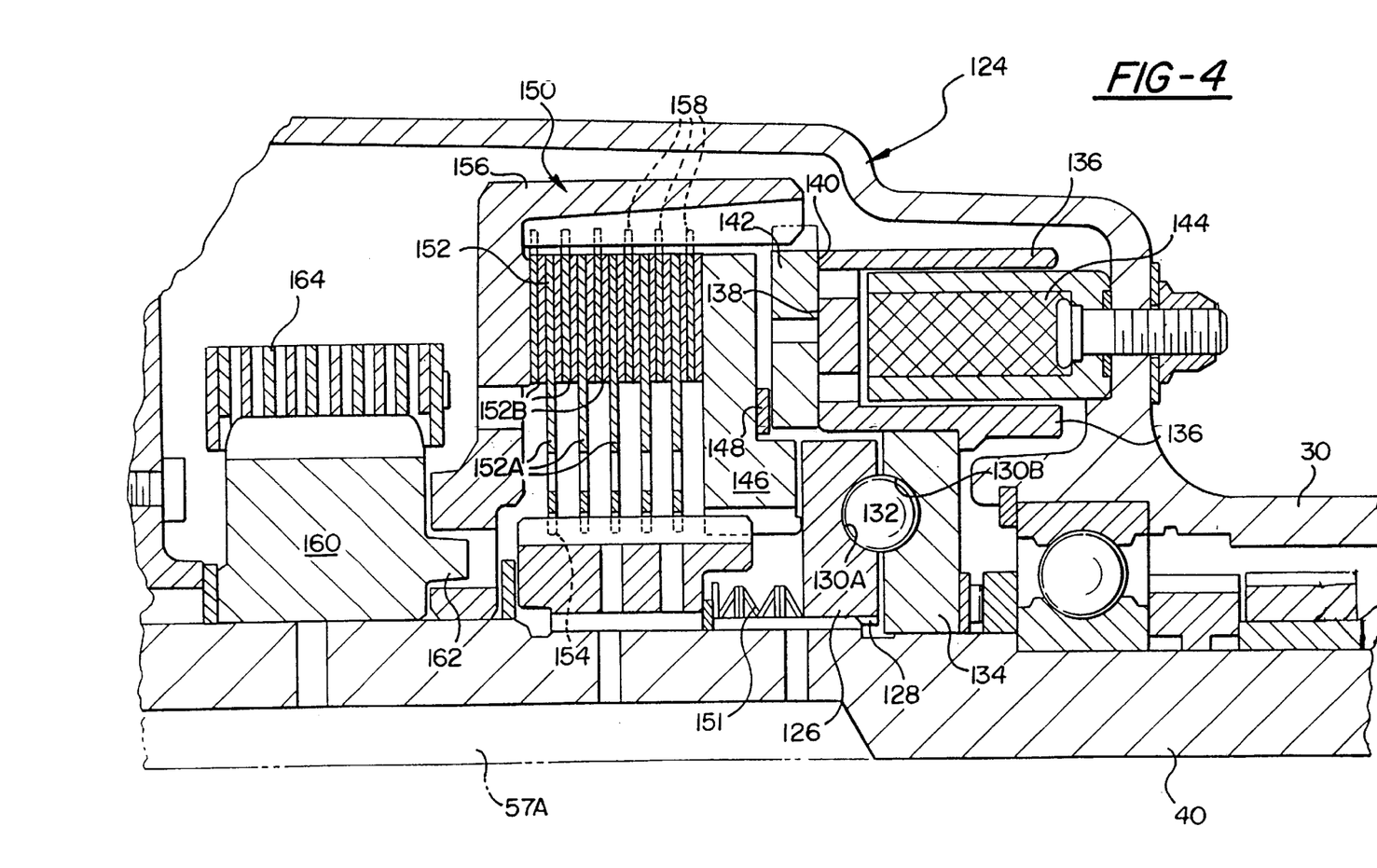
FIG. 4 is an enlarged, fragmentary, cross-sectional side view of the electromagnetic clutch assembly according to the present invention.

Referring now to FIGS. 2 and 4, the transfer case 28 also includes an electromagnetically actuated disk pack type clutch assembly 124. The clutch assembly 124 is disposed about the output shaft 40 and includes a circular drive member 126, which is coupled to the output shaft 40 through a splined interconnection 128. The circular drive member 126 includes a plurality of circumferentially spaced apart recesses 130A in the shape of an oblique section of a helical torus as illustrated in FIG. 3. Each of the recesses 130A receives one of a like plurality of load transferring balls 132.

A circular, driven member 134 is disposed adjacent to the circular drive member 126 and includes a like plurality of opposed recesses 130B defining the same shape as the recesses 130A. The oblique side walls of the recesses 130A and 130B function as ramps or cams and cooperate with the balls 132 to drive the circular members 126, 134 apart in response to relative rotation therebetween. However, those having ordinary skill in the art will appreciate that the recesses 130A and 130B as well as the load transferring balls 132 may be replaced with other analogous mechanical elements which cause axial displacement of the circular, drive and driven members 126, 134, respectively, in response to relative rotation therebetween. For example, tapered rollers disposed in complementary, configured, conical helices may be employed here.

The circular driven member 134 extends radially outwardly and is secured to a rotor, which also serves as an electromagnetic coil housing 136. The coil housing 136 includes a face 138 that is disposed in opposed relationship with a clutch face 140 on an armature 142. The coil housing 136 defines a U-shape in cross-section and surrounds an electromagnetic coil 144 on three sides.

The electromagnetic coil 144 is provided with incrementally adjusted levels of electrical energy from a pulse width modulation (PWM) control (not shown). The pulse width modulation scheme utilized in the present invention is conventional and increases or decreases the average current to the coil 144 of the electromagnetic clutch assembly 124 and thus torque throughput by increasing or decreasing the on-time (duty cycle) of a thirty-three (33) Hertz signal. However, those having ordinary skill in the art will appreciate that other modulating control techniques may be utilized to achieve incremental engagement and disengagement of the modulating clutch assembly 124.

Providing electrical energy to the electromagnetic coil 144 causes magnetic attraction of the armature 142 to the coil housing 136. This magnetic attraction results in frictional contact of the armature 142 to the coil housing 136. When the output shaft 40 is turning at a different speed than the armature 142 which turns at the same rotational speed as the secondary output shaft 26, this frictional contact results in a frictional torque being transferred from the output shaft 40 through the circular drive member 126, through the load transferring balls 132 and to the circular driven member 134. The resulting frictional torque causes the balls 132 to ride up the ramps of the recesses 130A and 130B causing axial displacement of the circular drive member 126. Axial displacement of the circular drive member 126 translates an apply plate 146 and a washer 148 disposed between the armature 142 and the apply plate 146 axially toward a disk pack clutch assembly, generally indicated at 150. A compression spring 151 provides a restoring force which biases the circular drive member 126 toward the circular driven member 134 and returns the load transferring balls 132 to center positions in the circular recesses 130A and 130B to provide maximum clearance and minimum friction between the components of the electromagnetic clutch assembly 124 when it is deactivated.

The disk pack clutch assembly 150 includes a plurality of interleaved friction plates or disks 152. A first plurality of disks 152A are coupled by inter-engaging splines 154 to a clutch hub 155 which is coupled to the output shaft 40 for rotation therewith. A second plurality of disks 152B are coupled to an annular housing 156 by inter-engaging splines 158 for rotation therewith.

The annular housing 156 is disposed for free rotation about the output shaft 40 and is coupled to a chain drive sprocket 160 by a plurality of inter-engaging lugs and recesses 162. The drive sprocket 160 is also rotatably disposed on the output shaft 40. When the clutch assembly 124 is engaged, it transfers energy from the output shaft 40 to the chain drive sprocket 160. A drive chain 164 is received upon the teeth of the chain drive sprocket 160 and engages and transfers rotational energy to a driven chain and sprocket 166. The driven sprocket 166 is coupled to the front (secondary) output shaft 26 of the transfer case 28 by inter-engaging splines 168.

Those having ordinary skill in the art will appreciate that the design and geometry of the recesses 130A, 130B as well as the balls 132, the design of the washer 148, the compression spring 151 and the clearances in the clutch assembly 124 ensure that the clutch assembly 124 is not self-locking. The electromagnetic clutch assembly 124 must not self-engage, but rather, must be capable of modulating clamping of the clutch disks 152 and torque transfer in direct response to the increment or decremented step-wise PWM control unit. Furthermore, those having ordinary skill in the art will appreciate that while the electromagnetic clutch assembly 124 described above incorporates electromagnetic activation means, it may also be operated in the same manner by hydraulic or pneumatic operators provided with controlled, pressurized hydraulic fluid or pressurized air, respectively.

Referring specifically to FIG. 2, the transfer case 28 also includes an input tone wheel 174 that is coupled to and rotates with the front input shaft 50. A first, input Hall effect sensor 170 is disposed in proximate, sensing relationship with a plurality of teeth 172 on the tone wheel 174. The output of the first Hall effect sensor is carried in electrical conductors 176. Similarly, an output tone wheel 184 is disposed on the rear (primary) output shaft 40. A second output Hall effect sensor 180 is disposed in proximate, sensing relationship with a plurality of teeth 182 on the output tone wheel 184. The output of the second Hall effect sensor 180 is carried in electrical conductors 186. Preferably, the number of teeth 172 on the tone wheel 174 is identical to the number of teeth 182 on the tone wheel 184 so that identical shaft speeds result in the same number of pulses per unit time from the Hall effect sensors 170 and 180. This simplifies computations relating to shaft speeds and improves the accuracy of all logic decisions based on such data and computations. The actual number of teeth 172 on the tone wheel 174 and teeth 182 on the tone wheel 184 may vary from 25 to 50 or more or fewer depending upon the rotational speeds and sensor construction.

The first and second Hall effect sensors 170 and 180 sense the respective teeth 172 and 182 and provide a series of pulses which may be utilized to compute the instantaneous rotational speeds of the input shaft 50 and the rear output shaft 40. The rotational speeds of the input shaft 50 correspond to the rotational speeds of the output of the transmission 44. Likewise, the rotational speed of the rear output shaft 40 corresponds to the rotational speed of the rear drive shaft 38.

Hall effect sensors are preferred inasmuch as they provide an output signal which alternates between a well defined high and low signal value as the sensed teeth pass. However, those having ordinary skill in the art will appreciate that other sensing devices such as, for example, variable reluctance sensors may be utilized. Such sensors do not, however, provide the clean waveform provided by Hall effect sensors, particularly at low shaft speeds, and thus, may require extra input conditioning to provide usable data. It will also be appreciated that the Hall effect sensors 170 and 180 and the respective adjacent teeth 172 and 182 on the tone wheel 174, 184 are preferably located within the housing 30 of the transfer case 28 but may be located at any convenient site along the transmission output/transfer case input shaft 50 and the rear (primary) output shaft 40 and the primary drive line. It is also possible to sense the speed of either or both shafts through a gear reduction unit such as the rear differential 36 if proper scaling factors are included in a signal processor to compensate for the gear ratio of the unit. Thus, the properly scaled outputs of rear wheel speed sensors utilized with an anti-lock brake system, for example, could be averaged to provide the speed of the output shaft 40 subject to the caveat noted above regarding speed sensing at diverse locations along the drive lines.

Referring again to FIGS. 1 and 2, direct electrical signals from the first Hall effect sensor 170 are carried in the conductors 176 and through a small discrete electrical wiring harness 204 to a microprocessor, such as control unit 200. Likewise, the signal from the second Hall effect sensor 180 carried in the conductors 186 is also provided through wiring harness 204 to control unit 200. Finally, signals commanding shift changes from the control unit 200 to the actuator which, in this case, is the shift control motor 100, are also sent back from the control unit 200 to the actuator 100 through the discrete electrical wiring harness 204. In another non-limiting embodiment, control unit 200 may be physically located upon or within the transfer case 28, such that the Hall effect sensors 170 and 180 and the actuator 100 are wired directly to control unit 200 and external wiring harness 204 is unnecessary.

The control unit 200 communicates across the CAN data bus 250 with the other networked vehicle systems and sensors through the digital data interface 201. The digital data interface 201 provides the proper signal control and digital data transfer protocols to allow the control unit 200 to send and receive digital data through the CAN data bus 250. As such, as shown in FIG. 1, the control unit 200 receives input from the operator-controlled shift change selector 202 through the CAN bus 250 and digital data interface 201 which initiates a respective gear change in the transfer case 28. In another non-limiting embodiment, the digital data interface 201 may be part of the CAN system directly and not part of the present invention.

Figure 5A:
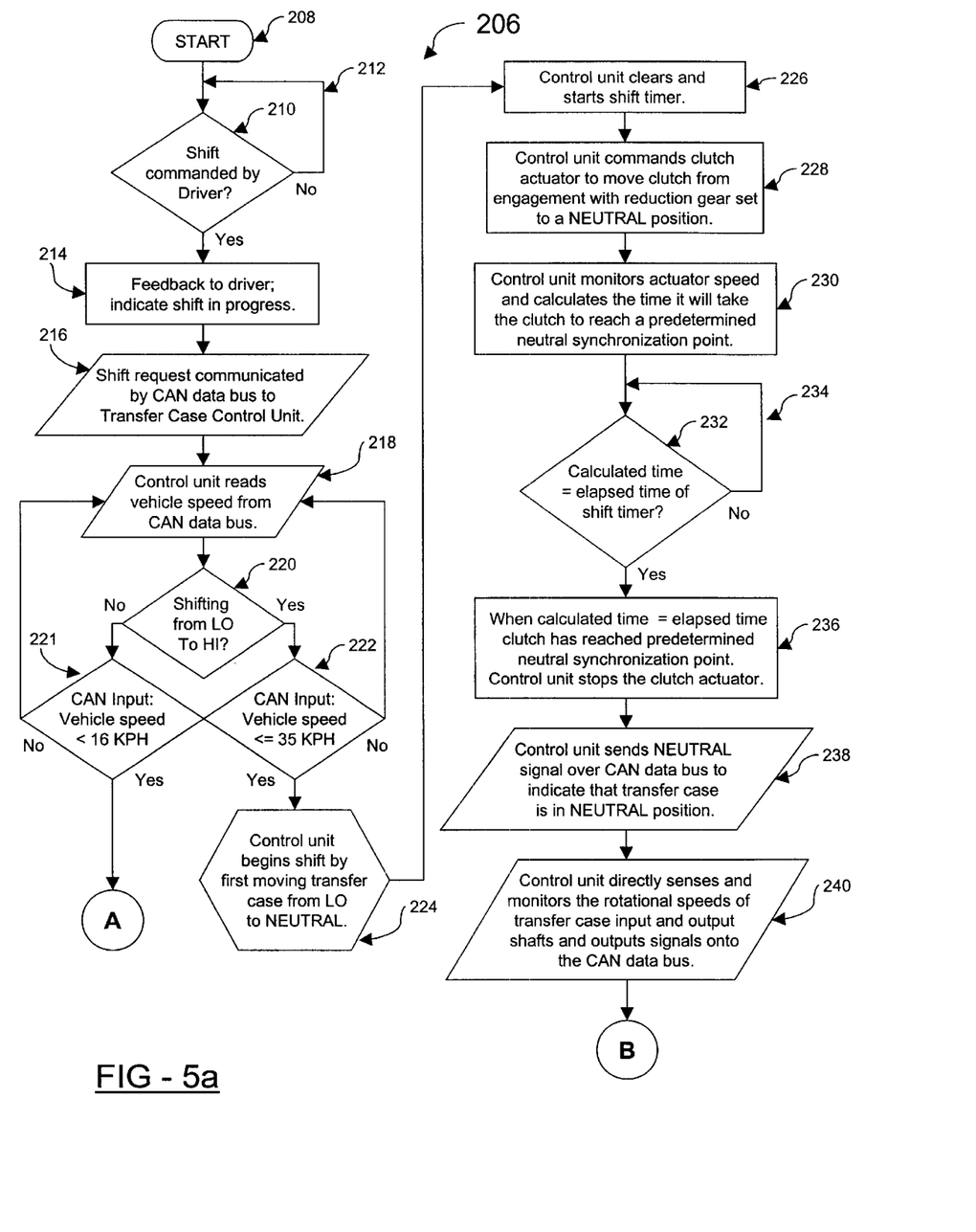
FIGS. 5a and 5b depict a flow diagram representing the method for providing synchronization of low to high shifts in a transfer case within a vehicle having a CAN digital data bus system according to the present invention.
Figure 5B:
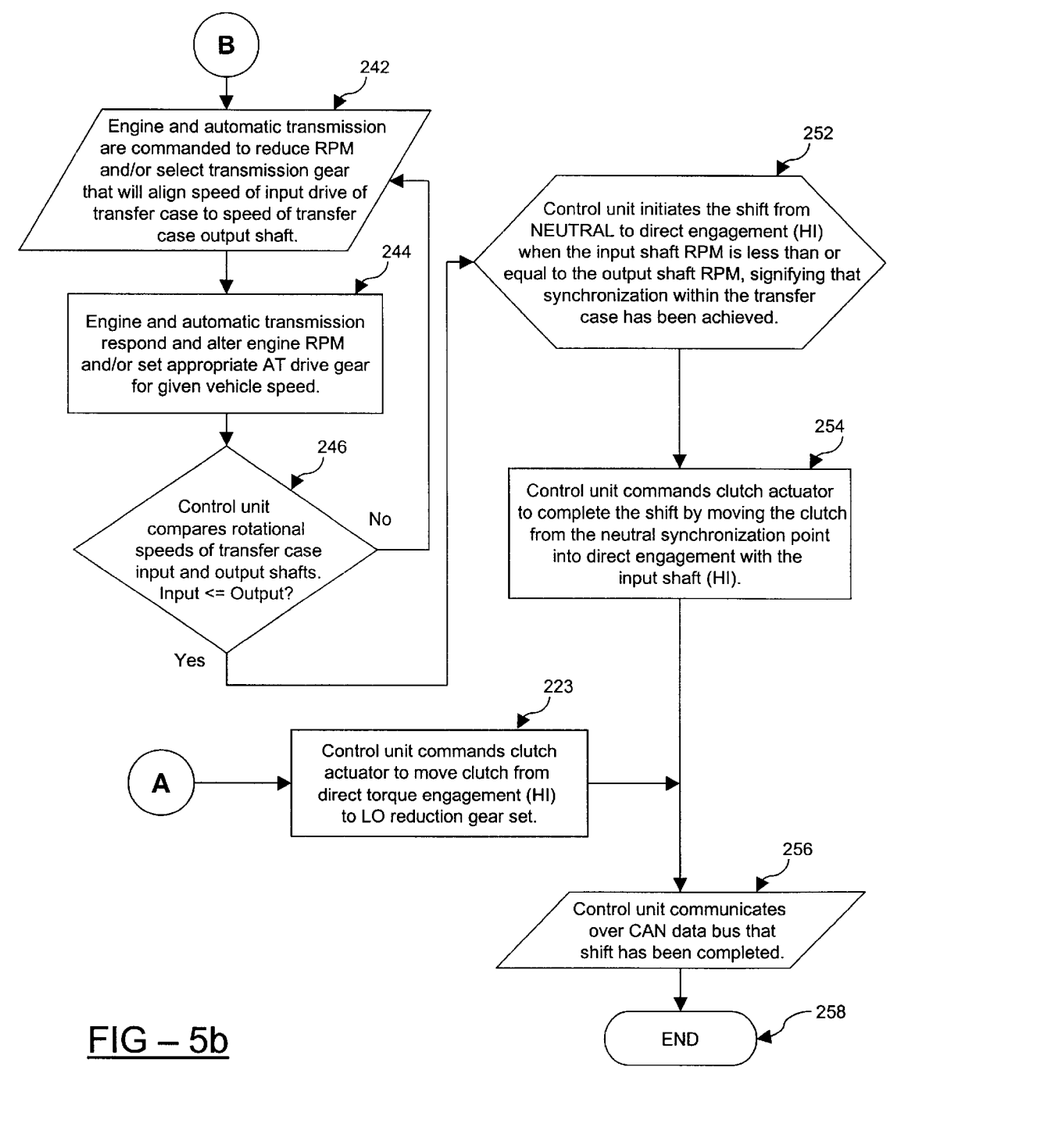

Referring now to FIGS. 5a and 5b, the method of synchronizing low to high shifts in a transfer case of the present invention will be described in greater detail. The method is described in connection with the flow chart 206, which in essence, outlines a sub-routine of the transfer case control unit 200 as it interfaces with the CAN system and other vehicle systems. Those having ordinary skill in the art will appreciate that flow chart 206 may be only one of a number of other programs or sub-routines that control the operation of the transfer case control unit 200. It should be further appreciated that, though not repetitively mentioned, all data signals in and out of the control unit 200 to the CAN data bus 250 are routed through the digital data interface 201.

The method of the present invention as illustrated in flow chart 206 (FIGS. 5a and 5b) controls the shift control motor or actuator 100 with the object of achieving a virtually undetectable, on-the-fly, LO to HI shift of the gearing within the transfer case 28. Thus, the method of the present invention controls a shift from a low range, where the torque is translated from the input shaft 50 to the output shaft 40 through the planetary reduction gear set 48, to a high range where torque is translated directly between the input shaft 50 and the output shaft 40 via the dog clutch 84.

The method starts at 208. The decision point 210 may form a portion of an executive system or large control loop in a microprocessor vehicle management system (not shown), which would monitor or detect, through the CAN system, whether the shift change selector 202 has been moved into a low or high position such that a shift has been requested by the vehicle operator. If no shift has been requested, the related executive system or sub-routine may continue with other interrogations, computations and actions not relevant to the method of the present invention. However, the decision point 210 is continually monitored to detect when a shift has been selected as indicated by loop feedback line 212.

On the other hand, if a shift has been selected, the operator is given a visual signal that a shift is in progress as indicated at process step 214. This indicator may be a blinking light in the passenger compartment of the automotive vehicle, but it may take the form of any suitable visual or audio indicator. As the vehicle management system uses one of the above-mentioned methods of feedback (step 214) to notify the driver that the shift is in progress, it also sends a shift request command through the CAN data bus 250 (FIG. 1) to the transfer case control unit 200 at step 216.

The control unit 200 initiates the shift by reading the vehicle speed from the CAN data bus 250, as indicated in block 218. Depending upon the design protocol within the application of the vehicle's CAN system, certain vehicle and environmental conditions and/or parameters may always be output to the data bus and available for the other network systems to access at any given time. Conversely, the CAN system may be designed to first require that an inquiry be sent by the system or sub-system in question before operating or environmental data is sent back through the CAN data bus 250 by the queried system in response. Regardless, that operating design characteristic is beyond the scope of this specification. For purposes of discussion here, it will be assumed that the operational data of the vehicle is sent across the data bus automatically with periodic updates.

Continuing with flow chart 206, once a shift has been indicated and the control unit 200 (FIG. 1) does an initial read of vehicle speed, decision point 220 is entered. There, the control unit 200 determines whether a shift from LO to HI has been requested. If the answer is no, meaning that the shift is from HI to LO, the decision point is exited at NO. Thereafter, the decision point 221 is entered and the control unit 200 determines whether the speed of the vehicle is less than 16 kilometers per hour (kph). If the vehicle speed is greater than 16 kph, the decision point 221 is exited at NO and the sub-routine returns to data block 218 and rereads the vehicle speed. If, on the other hand, the vehicle speed is less than 16 kph, the decision point 221 is exited at YES and the shift is commanded by the control unit 200 as indicated at process step 223 (via connector "A" to FIG. 5b). The shift control motor or actuator 100 moves the dog clutch 84 from its HI position, that is, a position which is located to the left of that illustrated in FIG. 2, to the neutral position, that is, the position of dog clutch 84 as depicted in FIG. 2. Thereafter, with the speed of the vehicle less than 16 kph, the shift is completed as the actuator 100 moves the dog clutch 84 completely to the right of that shown in FIG. 2 such that torque is translated from the input shaft 50 to the output shaft 40 via the low gear reduction set 48 and the dog clutch 84.

Alternatively, when a LO to HI shift has been selected, the decision point 220 is exited at YES. In this case, the sub-routine 206 enters the decision point 222 and the control unit 200 determines whether the speed of the vehicle is less than, or equal to 35 kph. If it is not, the decision point 222 is exited at NO and the sub-routine returns to data block 218 and rereads the vehicle speed. Thus, in the preferred embodiment, the vehicle must be traveling at, or less than 35 kph as the decision block 222 will not allow the subroutine to continue until that condition is met.

If the control unit 200 determines that the vehicle is traveling at less than 35 kph, the decision point 222 is exited at YES and the control unit's internal shift timer is cleared and started as indicated at process step 226. In the preferred embodiment of the method of the present invention, the transfer case 28 is first shifted into neutral before completing the LO to HI shift as indicated in process preparation step 224. As indicated at process step 228, clutch actuator 100 is commanded to move the clutch 84 from engagement with the reduction (low) gear set 48 to first a predetermined neutral position (illustrated in FIG. 2). As the actuator 100 moves the clutch 84, the control unit 200 measures and monitors the speed of the actuator 100, in process step 230. Also in this step, the control unit 200 calculates the time it will take the clutch actuator 100 to reach, first the predetermined neutral position, and then a predetermined neutral synchronization point. Moving the dog clutch 84 to the predetermined neutral synchronization point brings the clutch teeth 86 into close physical proximity (preparatory to a direct engagement) with the input shaft teeth 58. The control unit 200 calculates the time as a function of the monitored rotational speed of the actuator 100 and the known angular distance the actuator mechanism must travel to reach the neutral synchronization point.

Once the calculation has been performed and a time solution determined, the calculated time is compared to the running elapsed time in the shift timer, as shown in decision block 232. If the elapsed time is not yet equal to the calculated time, the decision point 232 is exited at NO and the control unit 200 reenters decision point 232 (shown as feedback loop 234) until the time comparison is equal. When this condition is met, the sub-routine is allowed to exit the 232 decision block as a YES and moves to process step 236. At 236, with the elapsed time now equaling the calculated time, the neutral synchronization point has been reached and the control unit 200 stops the actuator 100. Once step 236 has been completed and the clutch has been shifted out of engagement with the low gear set and achieved the neutral synchronization point, the control unit 200 sends a NEUTRAL signal across the CAN data bus 250 at step 238. This digital information is to be used by the engine system and the automatic transmission system. It should be appreciated that if the vehicle is designed with the aforementioned vehicle management system, that the signals may be first processed by the management system before being routed to the engine and automatic transmission systems. In step 240, using the input and output Hall effect sensors 170, 180, the control unit 200 senses the rotational speeds of the transfer case input and output shafts 50, 40, respectively and sends the data out onto the CAN data bus 250. When these signals are sent across the CAN data bus 250 they are sensed by either the programming of the vehicle management system, or the programming of the engine and the automatic transmission control systems, based on the design of the vehicle itself. The detection of these signals, in conjunction with the operator selected shift change and the NEUTRAL signal, results in a commanded engine RPM reduction and a selection of a lower automatic transmission gear in steps 242 and 244. This is necessary so that the transfer case shaft speeds can equalize. In another non-limiting embodiment, the automatic transmission may be disengaged and commanded to its neutral position until the shaft speeds are equalized and the transfer case shift is completed.

The control unit 200 continues to monitor the transfer case shaft speeds and if the output shaft RPM is greater than the input shaft RPM, the decision block exits the NO branch and loops back to step 242 until the change to the engine RPM and the automatic transmission gear settings satisfy the decision point. When the control unit 200 determines that the rotational speed of the input shaft 50 is less than or equal to the rotational speed of the output shaft 40, the control unit 200 determines that a synchronization state is achieved and the flow chart progresses from the YES exit of the decision block 246 to step 254, as indicated in process preparation step 252.

In step 254, the control unit 200 commands the clutch actuator 100 to move the dog clutch 84 to HI. This is accomplished by actuator 100 moving the dog clutch 84, and thereby the clutch teeth 86, from the neutral synchronization point to direct engagement with teeth 58 of the input shaft 50. At the same time, clutch teeth 86 also slide axially along, but remain directly engaged with, teeth 88 of the output shaft 40. Thereby, with clutch teeth 86 concurrently engaging teeth 58 of the input shaft 50 and teeth 88 of the output shaft 40, the clutch 84 provides direct torque translation between the input shaft 50 and the output shaft 40. However, the shift is only completed when the difference in the rotational speed of the input shaft 50 and the output shaft 40 is less than a predetermined value. In one preferred embodiment, this difference may be less than 100 rpm. Alternatively, the decision point 246 will also be exited at YES to complete the shift from LO to HI if the difference in the rotational speeds of the input shaft 50 and the output shaft 40 is greater than a predetermined value for a predetermined time. More specifically, the shift may be completed when the difference in the rotational speeds of the input and output shafts 50, 40, respectively, is greater than 100 rpm for a predetermined portion of the elapsed time. In one preferred method of the present invention, this predetermined portion may represent 20% of the elapsed time from the initiation of the shift. Otherwise, and in the absence of any of these conditions, the decision point 246 is exited at NO and the sub-routine loops back to step 242.

Additionally, if the dog clutch 84 cannot be moved out of engagement with the low planetary gear reduction set 48 into a NEUTRAL position at the initiation of the LO to HI shifting event (referred to as a "trapped" condition) the control unit 200 will abort the shift requests. The operator is notified if this condition occurs by the vehicle management system. The notification of a "termination of the shift in progress" is similar to the shift indication noted above regarding process step 214.

Accordingly, the present invention is a method and an apparatus for providing synchronization of low to high shifts in a digitally controlled transfer case, which allows for a high level of control and an accurate synchronization during the shift between low and high gears within a vehicle employing a CAN system. Furthermore, these objectives are achieved with the method and apparatus of the present invention in an efficient, cost effective and relatively simple manner.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of synchronizing low to high shifts in a transfer case used in an automotive vehicle having a controller area network, which passes digital data signals over a digital data bus to a transfer case control unit, said method comprising:

initiating an actuator to move a clutch from engagement with a gear set to a predetermined neutral synchronization point;

sensing the speed of the actuator and routing the signal to the control unit;

determining the time for the clutch to reach the predetermined neutral synchronization point as a function of the sensed speed of the actuator and the known rotational distance through which the actuator must move for the clutch to reach the predetermined neutral synchronization point;

maintaining the actuation of the clutch until it has reached the predetermined neutral synchronization point;

commanding the actuator to stop when the calculated time has elapsed for the clutch to reach the predetermined neutral synchronization point;

sensing the rotational speed of the transfer case input and output shafts;

comparing the input and output shaft rotational speed signals and determining a difference value;

commanding changes in engine RPM and automatic transmission gear settings through the control area network to bring the difference value within a predetermined range; and, completing the shift from low to high by commanding further actuation of the clutch from the predetermined neutral synchronization point to a direct torque engagement of the input and output shafts when the calculated difference in the rotational speeds of the input and output shafts is determined to fall within a set predetermined range, indicating synchronization of the shafts.

2. A method as set forth in claim 1 wherein the step of shifting is initiated by actuating a shift change selector that sends control signals through the controller area network to the transfer case control unit.

3. A method as set forth in claim 2 further including the step of providing feedback that a shift is in progress from the transfer case control unit through the controller area network.

4. A method as set forth in claim 3 further including the step of determining whether the transfer case shift is to be made from low to high speed or high to low speed in response to actuation of the shift change selector.

5. A method as set forth in claim 4 further including the steps of determining whether the speed of the vehicle is less than 35 kilometers per hour, and clearing and starting a shift timer before initiating the actuator to move the clutch from engagement with the gear set to the neutral position.

6. A method as set forth in claim 1 further including the step of completing the shift when the difference in the rotational speeds of the input and output shafts is less than 100 RPM.

7. A method as set forth in claim 1 further including the step of completing the shift from low to high if the difference in the rotational speeds of the input and output shafts is greater than a predetermined value for a predetermined time.

8. A method as set forth in claim 7 further including the step of completing the shift from low to high if the difference in the rotational speeds of the input and output shafts is greater than 100 RPM for a predetermined portion of the elapsed time from the initiation of the shift.

9. A method as set forth in claim 8 further including the step of completing the shift from low to high if the difference in the rotational speeds of the input and output shafts is greater than 100 RPM for a 20% of the elapsed time from the initiation of the shift.

10. A method as set forth in claim 1 further including the step of shifting the vehicle transmission into neutral before initiating the shift from low to high in the transfer case.

11. A transfer case having a synchronized low to high shift used in an automotive vehicle having a controller area network which passes digital data signals over a digital data bus, said transfer case comprising:
    an input shaft, an output shaft, and a gear set selectively operable to translate torque between said input and output shafts at reduced speeds;
    a clutch operable to translate torque between said input and said output shafts either directly or through said gear set, an actuator having a rotational output which is operatively coupled to said clutch for moving said clutch between predetermined positions;
    a control unit which calculates the speed of said actuator as it moves said clutch to a neutral position, said control unit further determining the additional time until said clutch will reach a predetermined neutral synchronization point using the speed of said actuator and the remaining rotational distance through which said actuator must move for said clutch to reach said predetermined neutral synchronization point, said control unit further operable to stop said actuator when said clutch has reached said neutral synchronization point for no longer than a predetermined time, said control unit further sensing and comparing the rotational speeds of said input and output shafts and signaling said actuator to complete the shift from low to high by moving said clutch to provide direct torque translation between said input and output shafts when the difference in the rotational speeds of said input and output shafts is less than a predetermined value; and,
    said controller area network including a digital data interface to allow the transfer of digital data between said control unit and other vehicle systems.

12. A transfer case as set forth in claim 11 further including a first speed sensor for providing an input shaft speed signal to said control unit.

13. A transfer case as set forth in claim 12 further including a second speed sensor for providing an output shaft speed signal to said control unit.

14. A transfer case as set forth in claim 11 wherein said clutch is a dog clutch mounted upon said output shaft and rotatable therewith, said clutch being translatable axially along said output shaft between a first position wherein said clutch engages said gear set and translates torque between said input and output shafts at reduced speeds, a neutral position wherein no torque is translated between said input and output shafts and a second position wherein torque is directly translated between said input and output shafts through said clutch.

15. A transfer case as set forth in claim 14 wherein said clutch includes a synchronization point located between said neutral position and said second position.

16. A transfer case as set forth is claim 11 wherein said control unit determines when said clutch has reached said predetermined neutral synchronization point and sends a signal to said controller area network through said digital interface indicating said transfer case is in neutral.

17. A transfer case as set forth in claim 11 wherein said control unit commands the actuator to move said clutch to complete the shift from low to high when the difference in the rotational speeds of said input and output shafts is less than 100 RPM.

18. A transfer case as set forth in claim 11 wherein said control unit commands said actuator to move said clutch to complete the shift from low to high when the difference in the rotational speeds of said input and output shafts is greater than a predetermined value for a predetermined time.

19. A transfer case as set forth in claim 18 wherein said control unit commands said actuator to move said clutch to complete the shift from low to high when the difference in the rotational speeds of said input and output shafts is greater than 100 RPM for a predetermined portion of the elapsed time from the initiation of the shift.

20. A transfer case as set forth in claim 19 wherein said control unit commands said actuator to move said clutch to complete the shift when the difference in the rotational speeds of said input and output shafts is greater than 100 RPM for at lease 20 percent of the elapsed time from the initiation of the shift.

* * * * *